UNITED STATES PATENT OFFICE.

EMIL FISCHER, OF BERLIN, GERMANY, ASSIGNOR TO C. F. BOEHRINGER & SOEHNE, OF WALDHOF, GERMANY.

PROCESS OF MAKING HETEROXANTHIN.

SPECIFICATION forming part of Letters Patent No. 617,986, dated January 17, 1899.

Original application filed September 7, 1897, Serial No. 650,826. Divided and this application filed January 3, 1898. Serial No. 665,462. (No specimens.)

*To all whom it may concern:*

Be it known that I, EMIL FISCHER, a citizen of the German Empire, residing at Berlin, in the Empire of Germany, have invented certain new and useful Improvements in Methods of Preparing Heteroxanthin; and I do hereby declare the following to be a full, clear, and exact description of the invention, such as will enable others skilled in the art to which it appertains to make and use the same.

This invention relates to the preparation of alkylized oxypurins, and more particularly to the synthetical production of heteroxanthin. This body, as the result of recent investigations, was recognized as monomethyl-xanthin by Krüger and Salomon. (See *Zeitschrift für Physiologische Chemie*, Vol. 21, page 169.) More recent researches by myself have shown this body to be a methylized oxypurin.

So far as I am aware heteroxanthin has hitherto been obtained only as a secretion formed in the animal organism, no one having produced it synthetically. I have discovered a method of thus producing heteroxanthin from theobromin; and my present invention consists in this method and such other steps, features, and subprocesses as will be hereinafter set forth, and pointed out in the claims.

In explaining my invention the nomenclature recently proposed by me (*Sitzungsberichte der Königl. Preussischen Akademie*, 1887, No. 1, January 8, 1897, and *Berichte der Deutschen Chemischen Gesellschaft*, Vol. 30, page 557) and the structural formulæ adopted as the result of the most recent investigations will be followed. According to this nomenclature the various atoms of the purin molecule which forms the basis of the uric acid and xanthin molecules and many others are numbered as follows:

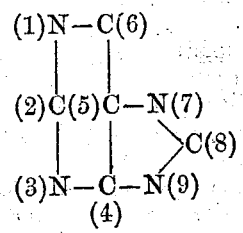

With these numerals and their relative positions as a guide the equivalent terms hereinafter used for the starting material—the theobromin—and the resultant body—heteroxanthin—as well as the intermediate body obtained, will be apparent and clearly understood.

The structural formulæ and consequent additional designations to be appropriated to the theobromin and heteroxanthin are as follows:

First. Theobromin or 3-7-dimethyl-xanthin or 3-7-dimethyl-2-6-dioxy-purin.

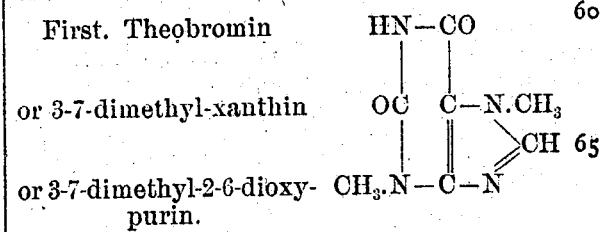

Second. Heteroxanthin or 7-methyl-xanthin or 7-methyl-2-6-dioxypurin

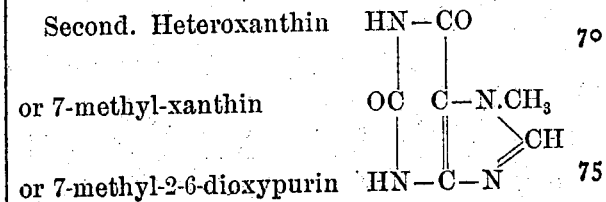

In carrying out my process I start with theobromin, treating it with a phosphorus oxyhalogen compound, such as phosphorus oxychlorid. Under this treatment the oxygen atoms are replaced by chlorin and one methyl radical is split off, the resultant body being 7-methyl-2-6-dichloropurin:

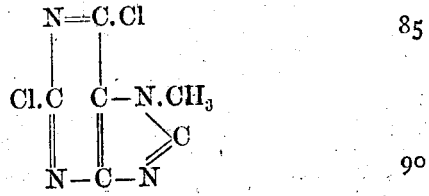

The two chlorin atoms of this new body—methyldichloropurin—are very mobile. They may be eliminated and replaced by hydroxyl simultaneously or separately.

The present invention involves the concurrent removal of both chlorin atoms by heating or treating the dichloropurin together with an acid, such as hydrochloric acid. This results in the loss of both chlorin atoms and the formation of heteroxanthin, according to the equation:

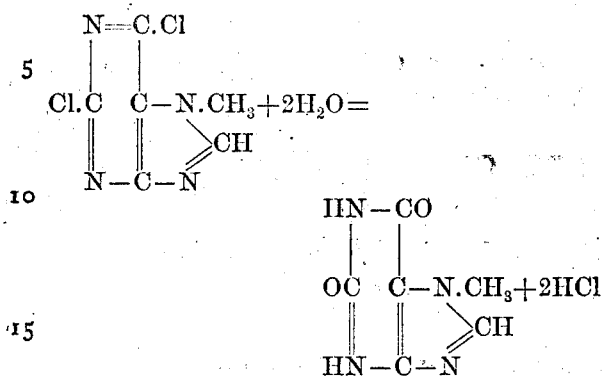

I will now give a detailed description of the preferred manner of carrying out my invention, the proportions being all understood to be by weight.

*First. Preparation of 7-methyl-2-6-dichloropurin.*—I take ten parts of theobromin and heat the same under pressure—e. g., in a digester—together with one hundred parts of phosphorus oxychlorid, to a temperature of 140° centigrade, this temperature being maintained for three hours and the mass constantly agitated. A clear liquid having a pale-brown color results. From this liquid the remaining phosphorus oxychlorid is removed by distilling *in vacuo*. One hundred and fifty parts of cold water having a temperature of between 0° and 5° centigrade, preferably, are then poured over the amorphous residue. Under this treatment the mass is gradually converted into almost colorless crystals. This change is hastened by shaking. The generation of heat in the mass is obviated by cooling with ice or other refrigerant agency. The mass after having been finally cooled thoroughly is put on the filter and washed with ice-water. The crude product so obtained is contaminated with a substance which is soluble in alkali. The same is hence dissolved out with an alkaline solution, preferably very dilute soda-lye of about one per cent. strength. The solid residue is then drained on a filter and well washed thereon and redissolved in hot water and recrystallized therefrom. The new compound 7-methyl-2-6-dichloropurin so obtained crystallizes in fine colorless needles, which melt at about 196° to 197° centigrade. It is soluble with difficulty in cold water and soluble in about seventy parts hot water and in about thirty parts boiling alcohol. Its composition is indicated by the formula $C_6H_4N_4Cl_2$ or the structural formula:

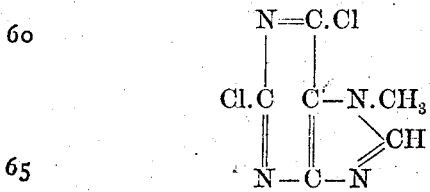

The reaction taking place in preparing the same from theobromin is indicated in the equation:

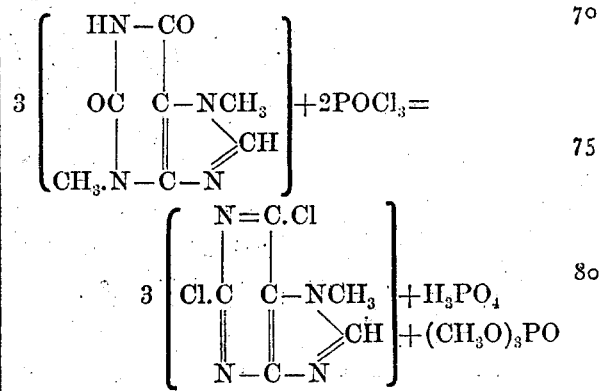

*Second. Preparation of heteroxanthin.*—I take one part of 7-methyl-2-6-dichloropurin and heat the same under pressure—e. g., in a pressure-tube—together with ten parts of hydrochloric acid of the specific gravity 1.19, to from 120° to 125° centigrade, maintaining this temperature for three hours. A clear faintly-colored solution results, which on being evaporated to dryness on the water-bath leaves the hydrochlorate of the heteroxanthin or methylxanthin in the shape of coarse prismatic crystals. The reaction takes place according to the following equation:

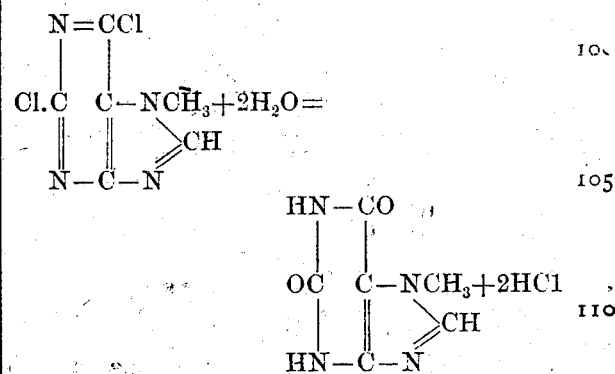

To liberate the base—heteroxanthin—dilute ammonia is poured over these crystals in sufficient or more than sufficient quantity to combine with all of the HCl. Any excess of ammonia is removed by evaporation. The difficultly-soluble base is then drained on the filter and redissolved in hot water, the solution being then allowed to cool. The base is thus obtained as a colorless indistinctly-crystalline powder. To obtain the base in an absolutely pure condition, it is purified by first preparing the sodium salt, which forms good crystals.

The heteroxanthin or 7-methyl-xanthin or 7-methyl-2-6-dioxypurin coincides in most respects with the heteroxanthin, which has been investigated and described by Krüger and Salomon (*Zeitschrift für Physiologische Chemie*, Vol. 21, page 169) as well as Bondzynski and Gottlieb, (*Berichte der Deutschen Chemischen Gesellschaft*, Vol. 28, 1895, page 1113 and *Archiv für Experimentale Pathologie & Pharmazie*, Vol. 37, page 385.) A difference was, however, observed with regard to the melting-point and the solubility of the base in water, the varying data found by the former investigations being due to the impurity of the ingredients or reagents employed.

I find that pure heteroxanthin has no fixed melting-point, but begins to soften when heated to over 360° centigrade and melts at about 380° centigrade, this change being accompanied by a darkening of the compound and the evolution of gases. One hundred and forty-two parts, by weight, of boiling water are required to dissolve one part of heteroxanthin.

The 7-methyl-2-6-dichloropurin herein described, together with its method of manufacture, forms the subject-matter of the claims of my application, Serial No. 650,826, filed September 7, 1897, (of which this is a divisional application,) and is there shown to be the secondary starting material for the series of processes and compounds described in illustration of the invention. They are hence not claimed herein, being merely described for the purpose of a full and sufficient disclosure of my present invention.

It will be seen from the above that my invention is not confined to the specific details shown in illustration of the same; but, broadly considered, it consists in the treatment of methyl-dichloropurin with a mineral acid and also in the conversion of theobromin into the methyl-dichloropurin, together with subsequent treatment of the latter with mineral acid.

Having thus fully described my invention, what I claim, and desire to secure by Letters Patent of the United States, is—

1. In the art of preparing heteroxanthin, the method which consists in treating 7-methyl-2-6-dichloropurin with a mineral acid.

2. In the art of preparing heteroxanthin, the method which consists in heating 7-methyl-2-6-dichloropurin together with a mineral acid such as hydrochloric acid under pressure.

3. The method which consists in heating 7-methyl-2-6-dichloropurin with hydrochloric acid solution under pressure, separating the hydrochlorate of heteroxanthin from the solution so formed and then adding dilute ammonia to the latter.

4. The method for the preparation of heteroxanthin, which consists in converting theobromin into 7-methyl-2-6-dichloropurin and then treating the latter with a mineral acid.

5. The method which consists in heating theobromin with phosphorous oxychlorid and purifying the resultant 7-methyl-2-6-dichloropurin, then heating the latter, with a mineral acid.

In testimony whereof I affix my signature in presence of two witnesses.

EMIL FISCHER.

Witnesses:
CHAS. H. DAY,
HENRY HASPER.